(12) United States Patent
Park et al.

(10) Patent No.: US 11,698,602 B2
(45) Date of Patent: Jul. 11, 2023

(54) TONER CARTRIDGE HAVING FRONT COVER

(71) Applicant: HEWLETT-PACKARD DEVELOPMENT COMPANY, L.P., Spring, TX (US)

(72) Inventors: Jonghyun Park, Seongnam-si (KR); Janghyun Son, Seongnam-si (KR); Hojin Jang, Seongnam-si (KR)

(73) Assignee: Hewlett-Packard Development Company L.P., Spring, TX (US)

( * ) Notice: Subject to any disclaimer, the term of this patent is extended or adjusted under 35 U.S.C. 154(b) by 0 days.

(21) Appl. No.: 17/792,463

(22) PCT Filed: Oct. 22, 2020

(86) PCT No.: PCT/US2020/056838
§ 371 (c)(1),
(2) Date: Jul. 13, 2022

(87) PCT Pub. No.: WO2021/252005
PCT Pub. Date: Dec. 16, 2021

(65) Prior Publication Data
US 2023/0041507 A1 Feb. 9, 2023

(30) Foreign Application Priority Data
Jun. 10, 2020 (KR) .................... 10-2020-0070153

(51) Int. Cl.
*G03G 21/18* (2006.01)
*G03G 15/08* (2006.01)

(52) U.S. Cl.
CPC ..... *G03G 21/1842* (2013.01); *G03G 15/0881* (2013.01); *G03G 2215/066* (2013.01); *G03G 2221/1654* (2013.01)

(58) Field of Classification Search
CPC .......... G03G 21/1842; G03G 15/0881; G03G 2215/066; G03G 2221/1654
See application file for complete search history.

(56) References Cited

U.S. PATENT DOCUMENTS 5,266,999 A * 11/1993 Yashiro .............. G03G 21/1628
399/114
2009/0016779 A1 1/2009 Hwang
2015/0261176 A1* 9/2015 Moon ................ G03G 21/1633
399/90

(Continued)

FOREIGN PATENT DOCUMENTS

CN 111090226 A 5/2020
EP 2 009 510 A1 12/2008
(Continued)

*Primary Examiner* — Ryan D Walsh
(74) *Attorney, Agent, or Firm* — Foley & Lardner LLP

(57) ABSTRACT

An image forming apparatus includes a main body provided with a mounting portion and an interference member, and a toner cartridge inserted into the mounting portion. The toner cartridge includes a housing containing toner, a coupling portion, a front cover coupled to one end of the housing via the coupling portion, and a switching member to weaken a coupling force of the coupling portion by interfering with the interference member when the toner cartridge is mounted on the mounting portion.

14 Claims, 13 Drawing Sheets

(56) References Cited

U.S. PATENT DOCUMENTS

2017/0075255 A1     3/2017   Huang
2018/0348694 A1* 12/2018   Koyama ............ G03G 21/1842
2022/0342348 A1* 10/2022   Kim .................. G03G 15/0886

FOREIGN PATENT DOCUMENTS

| EP | 2 299 333 A2 | | 3/2011 | |
|----|----|----|----|----|
| JP | 2014-137464 A | | 7/2014 | |
| JP | 2019060933 A | * | 4/2019 | ......... G03G 21/1647 |
| KR | 10-2019-0135317 A | | 12/2019 | |
| WO | WO-2020/046421 A1 | | 3/2020 | |
| WO | WO-2022010521 A1 | * | 1/2022 | |
| WO | WO-2022015353 A1 | * | 1/2022 | |
| WO | WO-2022025962 A1 | * | 2/2022 | |

\* cited by examiner

TONER CARTRIDGE HAVING FRONT COVER

BACKGROUND

Image forming apparatuses using an electrophotographic method supply toner to an electrostatic latent image formed on a photoconductor to form a visible toner image on the photoconductor, transfer the visible toner image to a print medium via an intermediate transfer medium or directly, and then mount the transferred visible toner image on the print medium.

Image forming apparatuses may include a toner cartridge which is attachable to and detachable from a main body. Toner cartridges are replaced when their service life has expired. When toner contained inside a toner cartridge is consumed, the toner cartridge may be removed from a main body, and a new toner cartridge may be mounted in the main body.

DETAILED DESCRIPTION

Figure 1:
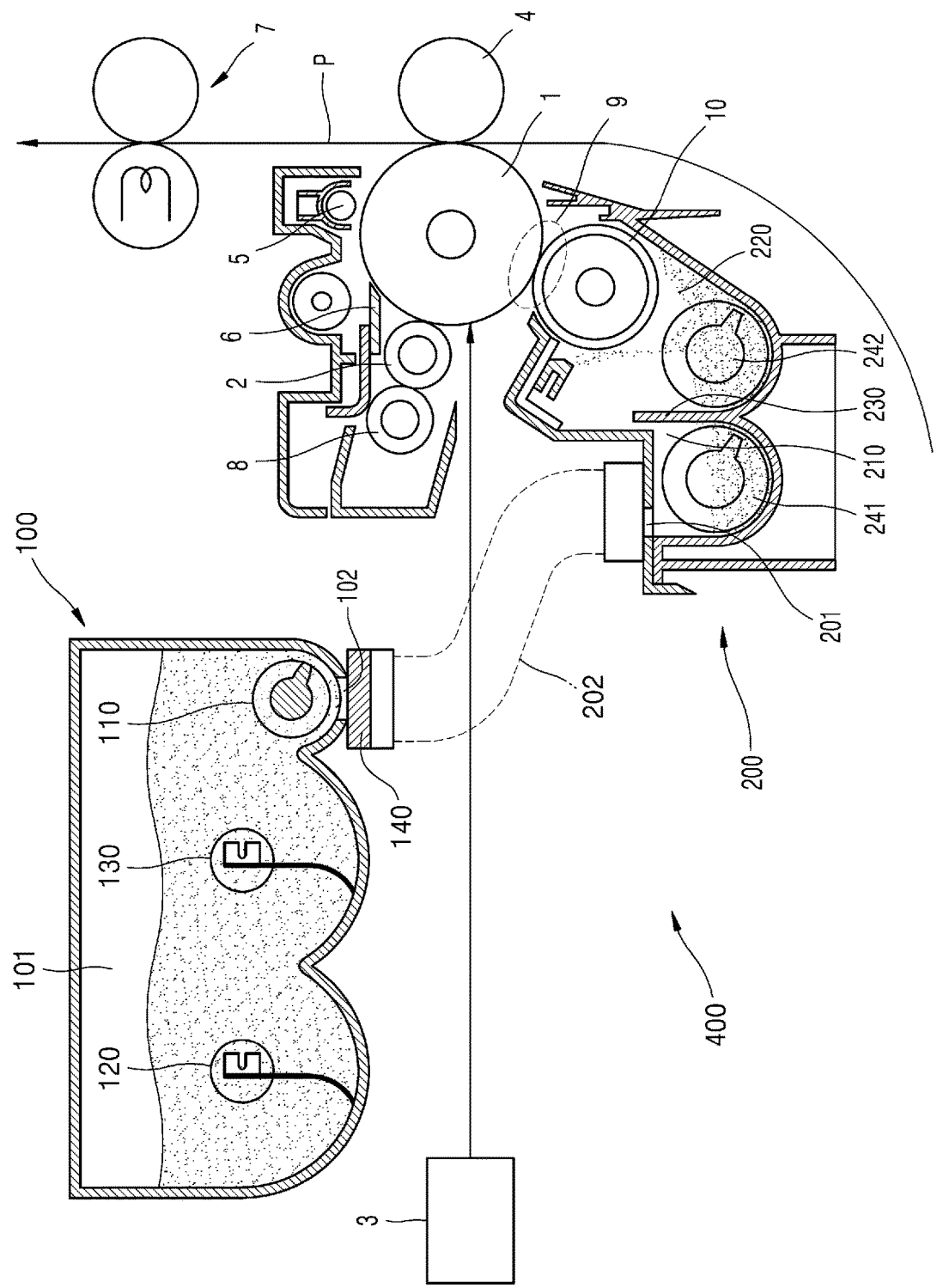
FIG. 1 is a block diagram of an example of an electrophotographic image forming apparatus.

An image forming apparatus to print an image on a print medium by an electrophotographic method includes a replaceable toner cartridge. A toner is contained in the toner cartridge. In order to prevent arbitrary replacement of the toner cartridge, the toner cartridge is locked to a main body when the toner cartridge is mounted in the main body of the image forming apparatus. When a user inputs a toner cartridge replacement command through an input device of the image forming apparatus or through a host connected to the image forming apparatus, the toner cartridge is unlocked and then is in a removable state with respect to the main body. When a user pulls the toner cartridge in a removal direction to arbitrarily remove the toner cartridge while the toner cartridge is locked in the main body, a locking device may be damaged.

According to an example of the toner cartridge and the image forming apparatus, when the toner cartridge is mounted in the main body, the toner cartridge is locked to the main body by the locking device. The toner cartridge includes a housing inserted into the main body, and a front cover coupled to a front portion of the housing, for example, an end in a removal direction. The front cover is coupled to the housing by a coupling portion. The coupling portion has a structure in which the coupling force is weakened by the external force. The weakened coupling force may be in that the front cover is separable from the housing of the toner cartridge when the front cover is pulled while the toner cartridge is mounted in the main body and is in a locked state. The external force may be provided by an interference member provided in the main body when the toner cartridge is mounted in the main body. According to the above configuration, when the toner cartridge is mounted in the main body, the interference member provided in the main body interferes with the coupling portion, and thus the coupling force of the coupling portion is weakened. In the above state, when the toner cartridge is pulled in a removal direction while holding the front cover of the toner cartridge, the front cover is separated from the housing of the toner cartridge. Therefore, the housing of the toner cartridge may be maintained in a state of being locked to the main body, and damage to the locking device may be prevented. Also, arbitrary replacement of the toner cartridge may be prevented. The front cover may be simply re-coupled to the housing of the toner cartridge by being pushed in a mounting direction.

Hereinafter, examples of a toner cartridge and an image forming apparatus having the same will be described with reference to the drawings. In the drawings, like reference numerals refer to like elements having like functions, and the size of each element may be exaggerated for clarity and convenience of the description.

Figure 2:
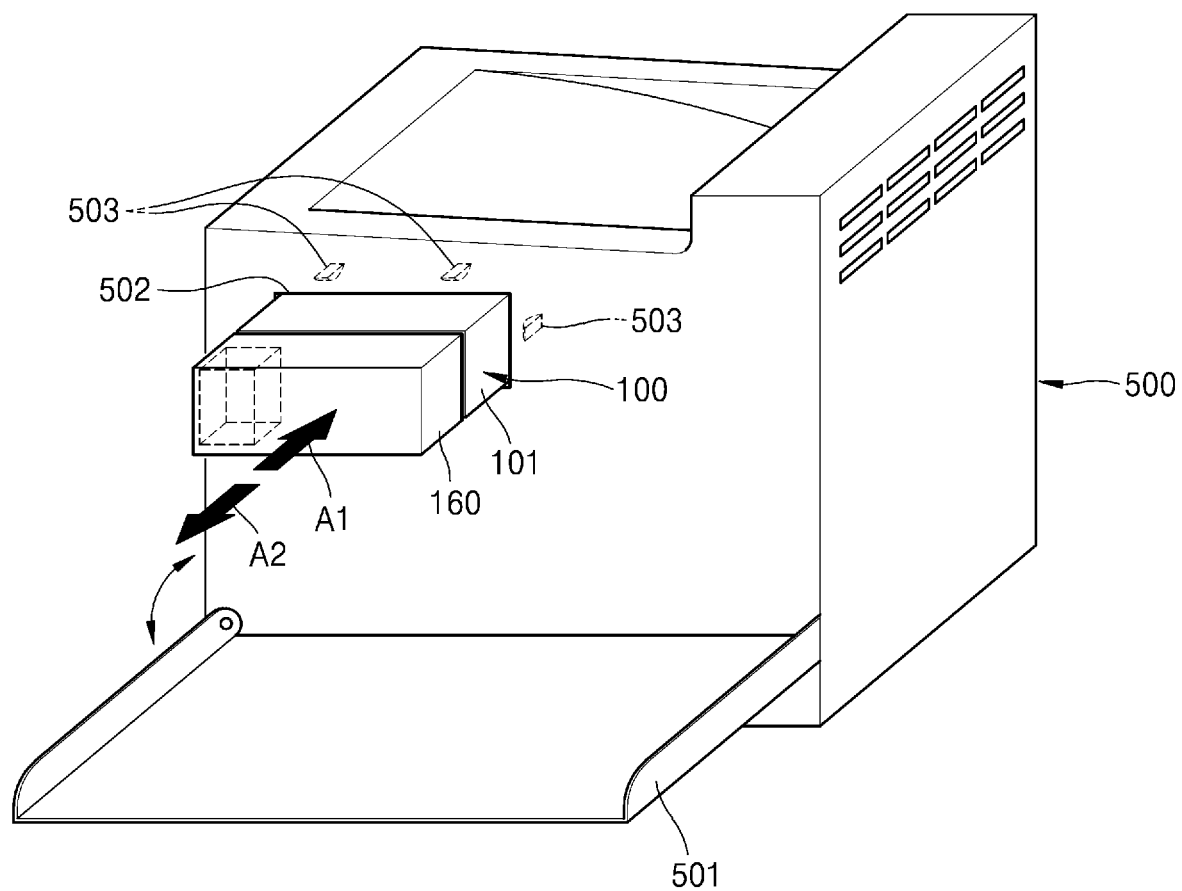
FIG. 2 is a perspective view showing an example in which a toner cartridge is replaced.
Figure 3:
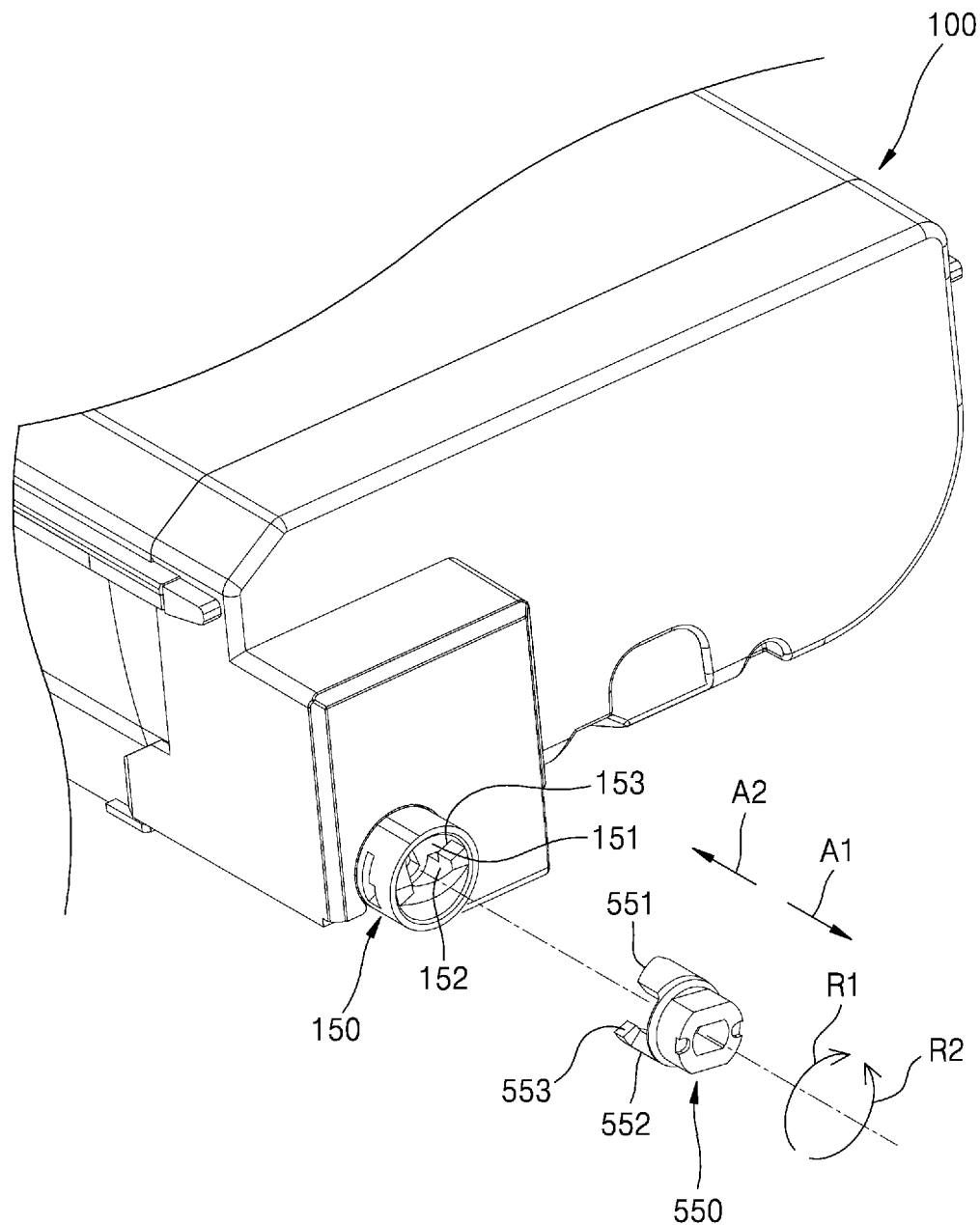
FIG. 3 is a partial perspective view of an example of a toner cartridge shown in FIG. 1.

FIG. 1 is a block diagram briefly illustrating an example of an electrophotographic image forming apparatus. FIG. 2 is a perspective view showing an example in which a toner cartridge 100 is replaced. FIG. 3 is a partial perspective view of an example of the toner cartridge 100. The image forming apparatus of an example is a monochromatic image forming apparatus, which employs a two-component developer including a toner and a magnetic carrier. A color of the toner is, for example, black.

Referring to FIGS. 1 and 2, the image forming apparatus may include a main body 500 having a printing portion 400 and a toner cartridge 100 being detachable with respect to the main body 500. The printing portion 400 prints an image on a print medium P by an electrophotographic method. According to an example, the printing portion 400 may include an optical scanner 3, a developing device 200, a transfer unit, and a fuser 7.

The optical scanner 3 irradiates a surface of a charged photosensitive drum 1 with light corresponding to image information to form an electrostatic latent image. As the optical scanner 3, for example, a laser scanning unit (LSU) to scan the photosensitive drum 1 by deflecting light emitted from a laser diode in a main scanning direction using a polygon mirror may be employed. As an example of the optical scanner 3, the optical scanner may be in a bar shape having a plurality of light emitting devices driven to be turned on/off so as to correspond to image information. For example, the light emitting diodes (LEDs) may be arranged in a main scanning direction.

The developing device 200 mixes and agitates a toner and a carrier. The developing device 200 may include the photosensitive drum 1 and a developing roller 10. The photosensitive drum 1 is an example of a photoconductor in which an electrostatic latent image is formed. The photosensitive drum 1 may include a cylindrical metal pipe and a photosensitive layer having photoconductivity formed on the outer circumference of the cylindrical metal pipe. A charging roller 2 is an example of a charger to charge a surface of the photosensitive drum 1 to a uniform surface electric potential. The charging roller 2 is in contact with the photosensitive drum 1 to be rotated, and a charging bias voltage is applied to the charging roller 2. For example, the charger may include a corona charger to charge a surface of the photosensitive drum 1 by causing a corona discharge by applying a bias voltage between a flat electrode and a wire electrode. The developing roller 10 supplies the toner to the electrostatic latent image formed on the photosensitive drum 1 to develop the electrostatic latent image into a visible toner image. A cleaning roller 8 removes foreign substances on a surface of the charging roller 2. A cleaning blade 6 removes the toner remaining on the surface of the photosensitive drum 1 after a transfer operation. A static charge eliminator 5 to remove the residual electric potential on the photosensitive drum 1 may be arranged on an upstream side of the cleaning blade 6 with respect to a rotational direction of the photosensitive drum 1. The static eliminator 5 may irradiate, for example, the surface of the photosensitive drum 1 with light.

The developing device 200 may include an agitating chamber 210 and a developing chamber 220 side by side. The agitating chamber 210 and the developing chamber 220 are separated from each other by a barrier 230 extending in an axial direction of the developing roller 10. Openings (not shown) are provided at both ends of the barrier 230 in a longitudinal direction, that is, in the axial direction of the developing roller 10. The agitating chamber 210 and the developing chamber 220 are connected to each other by the openings. A first agitator 241 is installed in the agitating chamber 210. The developing roller 10 and a second agitator 242 are installed in the developing chamber 220. The first and second agitators 241 and 242 may be, for example, an auger having a shaft extending in the axial direction of the developing roller 10 and a spiral blade formed on the outer circumference of the shaft. When the first agitator 241 is rotated, a developer inside the agitating chamber 210 is conveyed in a first direction by the first agitator 241, and is conveyed to the developing chamber (220) through the opening provided adjacent to one end of the barrier 230. In the developing chamber 220, the developer is conveyed in a second direction, which is opposite to the first direction, by the second agitator 242, and is conveyed to the agitating chamber 210 through the opening provided adjacent to the other end of the barrier 230. As a result, the developer is circulated along the agitating chamber 210 and the developing chamber 220, and is supplied to the developing roller 10 positioned in the developing chamber 220 in a circulating operation.

The developing roller 10 conveys the developer including the toner and the carrier to a developing region 9 facing the photosensitive drum 1. The toner is attached to the carrier by the electrostatic force, and the carrier is attached to the surface of the developing roller 10 by the magnetic force. Therefore, a developer layer is formed on the surface of the developing roller 10. The developing roller 10 may be positioned spaced apart from the photosensitive drum 1 by a developing gap. The developing gap may be set to about tens to hundreds of micrometers. The toner is moved from the developing roller 10 to the photosensitive drum 1 by a developing bias voltage applied between the developing roller 10 and the photosensitive drum 1, and a visible toner image is formed on the surface of the photosensitive drum 1.

A transfer roller 4 is an example of a transfer unit to transfer the toner image formed on the photosensitive drum 1 to the print medium P. The transfer roller 4 faces the photosensitive drum 1 to form a transfer nip, and the transfer bias voltage is applied to the transfer roller 4. The toner image developed on the surface of the photosensitive drum 1 is transferred to the print medium P by a transfer electric field formed between the photosensitive drum 1 and the transfer roller 4 by the transfer bias voltage. A corona transfer unit using corona discharge may be employed instead of the transfer roller 4.

The toner image transferred to the print medium P is maintained by being attached to the print medium P by the electrostatic force. The print medium P passing through the transfer nip is conveyed to the fuser 7. The fuser 7 applies heat and pressure to fix the toner image on the print medium P.

As the toner in the developing device 200 is consumed, the toner may be supplied from the toner cartridge 100 to the developing device 200. The toner cartridge 100 includes a housing 101 in which the toner is contained. The housing 101 is provided with a toner outlet 102. A conveying member conveys the toner inside the housing 101 to the toner outlet 102. According to an example, the conveying member may include a toner discharge member 110 of a rotary auger shape to convey the toner in an axial direction, and paddle members 120 and 130 to convey the toner inside the housing 101 toward a toner discharge member 110. When the paddle members 120 and 130 are rotated, the toner inside the housing 101 is conveyed toward the toner discharge member 110. The toner discharge member 110 conveys the toner to the toner outlet 102. The toner cartridge 100 may include a shutter 140 to selectively open and close the toner outlet 102. The toner outlet 102 and a toner supply hole 201 of the developing device 200 may be connected by a toner supply member 202.

The toner cartridge 100 is attachable to and detachable from the image forming apparatus. Referring to FIG. 2, a part of the main body 500 may be opened by opening a door 501, and the toner cartridge 100 may be attached to and detached from the main body 500. The main body 500 is provided with a mounting portion 502 on which the toner cartridge 100 is mounted. The toner cartridge 100 may be slid in a mounting direction A1 and a removal direction A2 so as to be mounted in and removed from the main body 500. The mounting direction A1 and the removal direction A2 may be an axial direction (e.g., parallel to an axial direction) of a rotation member provided in the toner cartridge 100, for example, the toner discharge member 110 and the paddle members 120 and 130, or a longitudinal direction (e.g., parallel to a longitudinal direction) of the toner cartridge 100. Also, the mounting direction A1 and the removal direction A2 may be an axial direction (e.g., parallel to an axial direction) of the developing roller 10.

The shutter 140 is supported by the housing 101 to allow the toner outlet 102 to be moved to a closing position of closing the toner outlet 102 and an opening position of opening the toner outlet 102. The shutter 140 is positioned in the closing position while the toner cartridge 100 is removed from the main body 500. When the toner cartridge 100 may be mounted in the main body 500, the shutter 140 may be moved to the opening position of opening the toner outlet 102.

When the toner cartridge 100 is mounted in the main body 500, the toner cartridge 100 is connected to a motor (not shown) provided in the main body 500 by a coupling structure, and the rotation member of the toner cartridge is rotated by receiving rotation power from the motor. According to an example, referring to FIG. 3, the coupling structure may include a driving coupler 550 provided in the main body 500 and a driven coupler 150 provided in the toner cartridge 100. The driving coupler 550 may include a rotation power transmission portion 552. The driven coupler 150 may include a rotation power receiving portion 152 to receive rotation power from the rotation power transmission portion 552. When the toner cartridge 100 is mounted on the mounting portion 502 of the main body 500, the rotation power transmission portion 552 and the rotation power receiving portion 152 face each other in a rotational direction. When the driving coupler 550 is rotated in a first rotational direction R1, the rotation power transmission portion 552 pushes the rotation power receiving portion 152 in the first rotational direction R1. Therefore, the driven coupler 150 is rotated in the first rotational direction R1.

According to an example, a locking member to lock the toner cartridge 100 to the main body 500 so as not to allow the toner cartridge 100 to be moved in the removal direction A2 may be provided in the coupling structure. For example, a first locking portion 553 is provided at the driving coupler 550. In the driven coupler 150, a second locking portion 153 locked by the first locking portion 553 not to allow the toner cartridge 100 to be moved in the removal direction A2 is provided. The first locking portion 553 may extend from the rotation power transmission portion 552 in a circumferential direction. The second locking portion 153 may extend from the rotation power receiving portion 152 in a circumferential direction. The toner cartridge 100 is mounted on the mounting portion 502 of the main body 500 in a state in which the first and second locking portions 553 and 153 are displaced from each other in a rotational direction. When the toner cartridge 100 reaches a mounting position, the rotation power transmission portion 552 and the rotation power receiving portion 152 face each other in a rotational direction. When the driving coupler 550 is slightly rotated in the first rotational direction R1, the second locking portion 153 is locked by the first locking portion 553. In other words, the first and second locking portions 553 and 153 face each other in the removal direction A2. Therefore, the toner cartridge 100 may not be moved in the removal direction A2, and may be locked in the mounting position. When the driving coupler 550 is continuously rotated in the first rotational direction R1, the rotation power transmission portion 552 pushes the rotation power receiving portion 152 in the first rotational direction R1, and the driven coupler 150 is rotated in the first rotational direction R1.

The toner cartridge 100 is to be unlocked to remove the toner cartridge 100 from the mounting portion 502. For example, when the remaining amount of the developer inside the toner cartridge 100 reaches a replacement reference amount, a replacement signal which may be recognized by a user may be output to replace the toner cartridge 100 through an output device, not shown, for example, a display, a buzzer, and a lighting device. The replacement signal may be, for example, an image signal displayed on the display, a sound signal through the buzzer, and an optical signal through the lighting device. A user may input an operation of requesting replacement of the toner cartridge 100 through an operation panel. A controller, not shown, may guide a user operating procedure for replacement of the toner cartridge 100 through the display, and the user may replace the toner cartridge 100 by using a guide. The operating procedure may include input of a password to prevent arbitrary replacement of the toner cartridge 100. The controller slightly rotates the driving coupler 550 in a second rotational direction R2, which is opposite to the first rotational direction R1 by operation of a user. Therefore, the second locking portion 153 is released from the first locking portion 553, and the toner cartridge 100 is in a state which may be moved in the removal direction A2. The main body 500 may be provided with a pop-up structure that slightly pushes the toner cartridge 100 in the removal direction A2 after unlocking the first and second locking portions 553 and 153. For example, the pop-up structure may be realized by first and second inclined surfaces 551 and 151 respectively provided at the driving coupler 550 and the driven coupler 150 to slightly push the driven coupler 150 in the removal direction A2 by rotation of the driving coupler 550 in the second rotational direction R2. The pop-up structure is not limited to the example shown in FIG. 3. For example, the pop-up structure may have various structures such as an actuator and a cam structure that slightly push the toner cartridge 100 in the removal direction A2.

When the toner cartridge 100 is pulled in the removal direction A2 while the toner cartridge 100 is still locked, the first or second locking portion 553 or 153 may be damaged. In addition, the driving coupler 550, a driving portion provided in the main body 500 for driving the driving coupler 550 or the driven coupler 150 may be damaged.

Figure 4:
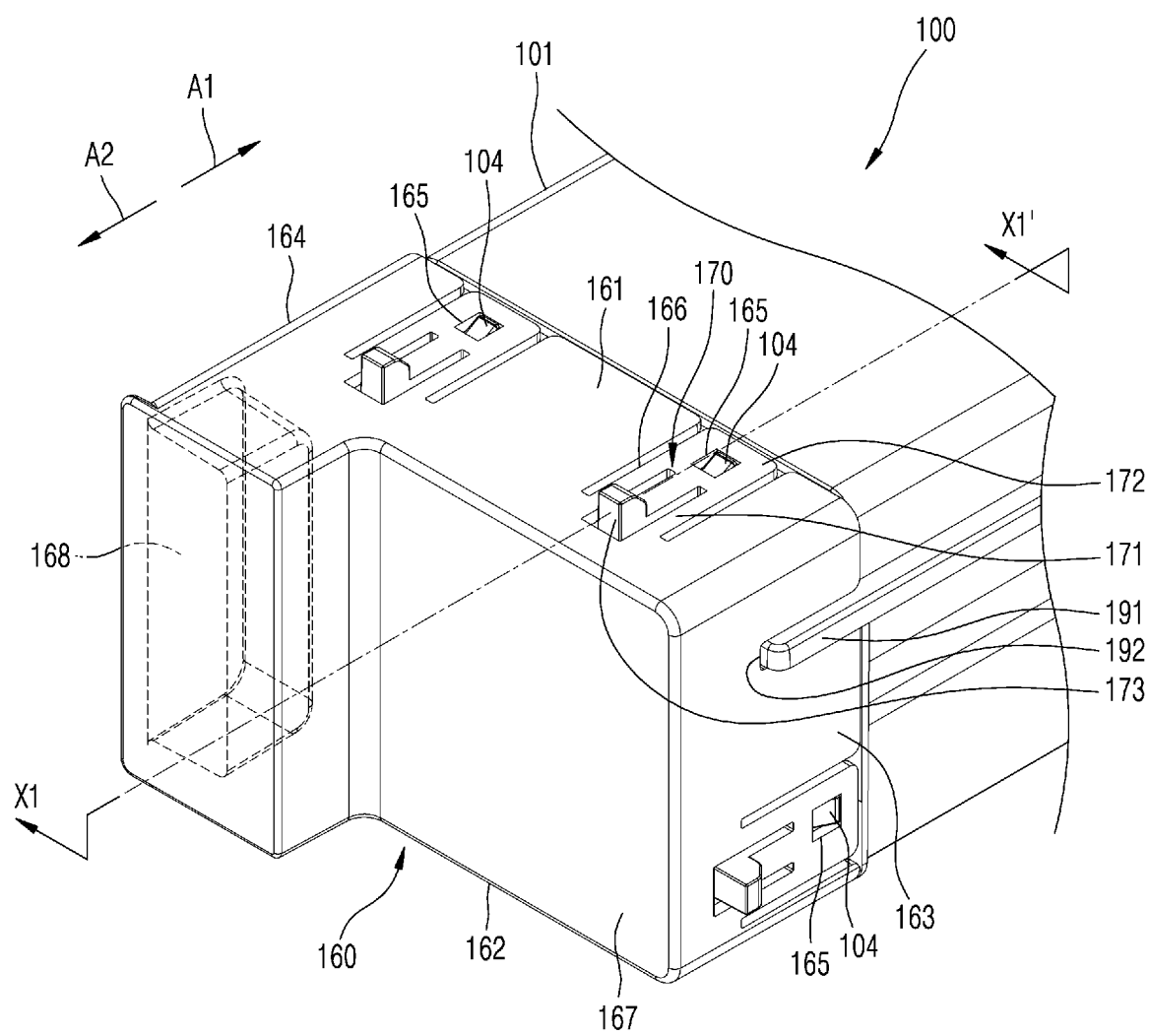
FIG. 4 is a partial perspective view of an example of the toner cartridge shown in FIG. 1.
Figure 5:
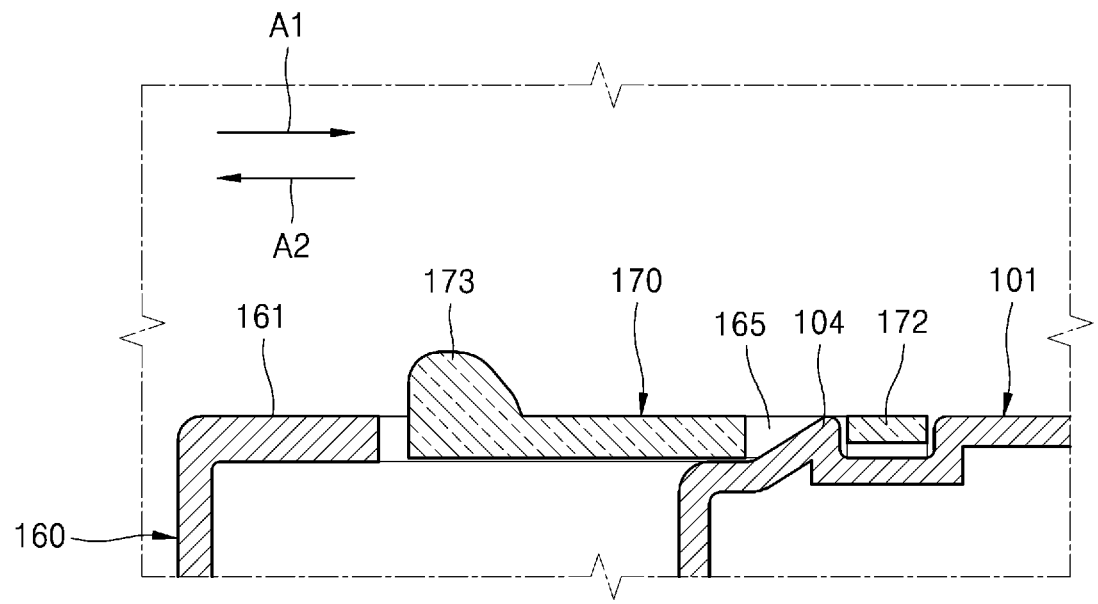
FIG. 5 is a cross-sectional view of the toner cartridge, taken along line X1-X1' of FIG. 4, showing a state in which the toner cartridge is separated from a main body.
Figure 6:
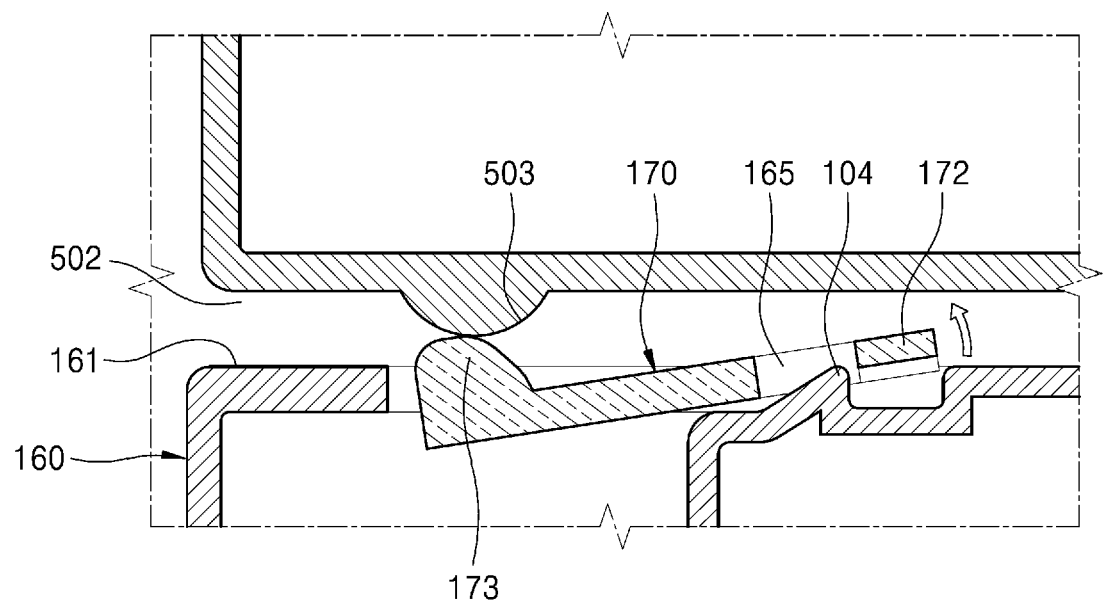
FIG. 6 is a cross-sectional view of the toner cartridge, taken along line X1-X1' of FIG. 4, showing a state in which the toner cartridge is mounted on a mounting portion of the main body.

FIG. 4 is a partial perspective view of an example of the toner cartridge 100. FIG. 5 is a cross-sectional view of the toner cartridge 100, taken along line X1-X1' of FIG. 4, and shows a state in which the toner cartridge 100 is separated from the main body 500. FIG. 6 is the cross-sectional view of the toner cartridge 100, taken along line X1-X1' of FIG. 4, and shows a state in which the toner cartridge 100 is mounted on the mounting portion 502 of the main body 500.

Referring to FIGS. 1 to 6, the image forming apparatus includes the main body 500 provided with the mounting portion 502 and an interference member 503, and the toner cartridge 100 inserted into the mounting portion 502. The toner cartridge 100 may include the housing 101 in which the toner is contained, a front cover 160 coupled to one end of the housing 101 in the mounting direction A1, the coupling portion to couple the front cover 160 with the housing 101, and a switching member interfering with the interference member 503 to weaken the coupling force of the coupling portion when the toner cartridge 100 is mounted on the mounting portion 502. The coupling portion may include a first coupling portion provided at one of the housing 101 and the front cover 160, and a second coupling portion provided at the other one of the housing 101 and the front cover 160 and having a shape complementary to a shape of the first coupling portion. The switching member may include the second coupling portion, and may be provided at the other one of the housing 101 and the front cover 160 to elastically switch from a first state (FIG. 5) in which the first and second coupling portions are coupled to each other into a second state (FIG. 6) in which the coupling force between the first and second coupling portions is weakened to allow the front cover 160 to be separated from the housing 101, by interfering with the interference member 503 when the toner cartridge 100 is mounted on the mounting portion 502.

Referring to FIG. 4, the front cover 160 is coupled to an end of the housing 101 in the mounting direction A1. The front cover 160 may be coupled to the housing 101 by at least one coupling portion. The coupling portion may include the first and second coupling portions. According to an example, the first coupling portion is provided in the housing 101, the second coupling portion is provided on the front cover 160, and the switching member is integrally formed with the front cover 160. Two second coupling portions are each provided at upper and lower portions 161 and 162 of the front cover 160, and one second coupling portion is each provided at both side portions 163 and 164. The first coupling portion is provided in the housing 101 to correspond to the second coupling portion. Hereinafter, the upper and lower portions 161 and 162, and the both side portions 163 and 164 of the front cover 160 may be collectively referred to as an outer circumference portion.

The first coupling portion may be realized by a protrusion 104 provided at one end of the housing 101 the removal direction A2. The protrusion 104 may protrude outward in a direction orthogonal to the removal direction A2. The second coupling portion may be realized by a through portion 165 formed through the front cover 160 to allow the protrusion 104 to be inserted. The through portion 165 is formed in a direction orthogonal to the mounting direction A1.

According to an example, the switching member may be integrally formed with the front cover 160. The front cover 160 may be made of a plastic material, for example. The switching member may include an elastic arm 170 provided on the front cover 160 to be elastically bent from the first state to the second state. The elastic arm 170 includes a connection portion 171 connected to the outer circumference portion of the front cover 160, and an elastic end portion 172 extending from the connection portion 171 and separated from the outer circumference portion by a plurality of slits 166. The elastic arm 170 may be bent using the connection portion 171 as a support portion. The elastic end portion 172 is provided with the through portion 165. The elastic arm 170 may be provided with an external force receiving portion 173 that interferes with the interference member 503 to switch the through portion 165 to the second state. The external force receiving portion 173 may be provided on an opposite side of the elastic end portion 172 with respect to the connection portion 171. The external force receiving portion 173 may be, for example, a shape protruding outward from the elastic arm 170. When the external force, in an inward direction, is applied to the external force receiving portion 173, the external force receiving portion 173 is pressed inward. Accordingly, the amount of insertion of the protrusion 104 into the through portion 165 decreases while the elastic end portion 172 is lifted outward, and the coupling force between the through portion 165 and the protrusion 104 is weakened. In the above state, when the front cover 160 is pulled in the removal direction A2, the front cover 160 may be separated from the housing 101 because the through portion 165 is separated from the protrusion 104.

In order to couple the front cover 160 with the housing 101, the protrusion 104 and the through portion 165 are aligned in the mounting direction A1, and the front cover is pushed in the mounting direction A1. When the elastic end portion 172 of the elastic arm 170 is in contact with the protrusion 104, the elastic end portion 172 is pushed by the protrusion 104, and thus is slightly lifted outward. When the protrusion 104 is inserted into the through portion 165, the elastic end portion 172 is returned to an original position. As shown in FIG. 5, the through portion 165 is in the first state, and the front cover 160 is coupled to the housing 101. The toner cartridge 100 may be provided with a guide structure to align the through portion 165 and the protrusion 104 to allow the front cover 160 to be easily coupled to the housing 101. For example, the guide structure may include a first guide 191 provided in the housing 101 and a second guide 192 having a shape complementary to a shape of the first guide 191 provided on the front cover 160. The first guide 191 may include, for example, a guide protrusion having a convex shape and extending in the mounting direction A1. The second guide 192 may include a guide groove cut and formed on the front cover 160 to allow the first guide 191 to be inserted. When the front cover 160 is positioned to allow the first guide 191 to be inserted into the second guide 192, and the front cover 160 is pushed in the mounting direction A1, the protrusion 104 and the through portion 165 are aligned in the mounting direction A1. Therefore, the front cover 160 may be easily coupled to the housing 101.

Referring to FIG. 2, the interference member 503 is provided on the mounting portion 502 of the main body 500. The interference member 503 interferes with the external force receiving portion 173 to press the external force receiving portion 173 inward when the toner cartridge 100 is mounted on the mounting portion 502. To this end, the interference member 503 may protrude inward from an edge of the mounting portion 502.

Referring to FIG. 5, the elastic arm 170 is maintained in the first state while the toner cartridge 100 is separated from the main body 500 or does not reach the mounting position. Therefore, the protrusion 104 is maintained in a state of being completely inserted into the through portion 165, and the front cover 160 is not separated from the housing 101 even when the front cover 160 is held and pulled in the removal direction A2. In the first state, the coupling force between the through portion 165 and the protrusion 104 is such that the front cover 160 is not separated when the toner cartridge 100 is handled while holding the front cover 160.

When the toner cartridge 100 is mounted on the mounting portion 502 of the main body 500 and approaches the mounting position, the interference member 503 interferes with the external force receiving portion 173 and the external force receiving portion 173 is pressed inward by the interference member 503. When the toner cartridge 100 reaches the mounting position, the external force receiving portion 173 is completely pressed, and the elastic end portion 172 is lifted outward, and thus, the through portion 165 is in the second state, as shown in FIG. 6. The amount of insertion of the protrusion 104 into the through portion 165 decreases, and thus, the coupling force between the through portion 165 and the protrusion 104 is weakened. When the toner cartridge 100 reaches the mounting position, as described in FIG. 3, the driving coupler 550 is slightly rotated in the first rotational direction R1, and the second locking portion 153 of the driven coupler 150 is locked by the first locking portion 553 of the driving coupler 550, and thus, the toner cartridge 100 is locked at the mounting position. In the above state, even when the toner cartridge 100 is pulled in the removal direction A2 while holding the front cover 160, the second and first locking portions 153 and 553 are locked, and thus, the toner cartridge 100 is not moved in the removal direction A2. Instead, the front cover 160 may be separated from the housing 101 while the through portion 165 with weakened coupling force may be released from the protrusion 104, and the toner cartridge 100 may be maintained in the mounting position.

According to the above configuration, the toner cartridge 100 may be prevented from being arbitrarily removed while the toner cartridge 100 may be locked in the main body 500. In addition, when the front cover 160 is pulled to arbitrarily remove the toner cartridge 100, the front cover 160 is separated from the housing 101, and thus, damage to a locking member, for example, the first and second locking portions 553 and 153, and the coupling structure may be prevented.

The separated front cover 160 may be mounted on the housing 101 again. For example, when the protrusion 104 and the through portion 165 are aligned in the mounting direction A1, and the front cover 160 is pushed in the mounting direction A1, the elastic end portion 172 is in contact with the protrusion 104 to allow the elastic arm 170 to be elastically bent outward, and thus, the through portion 165 is in the second state. When the protrusion 104 is inserted into the through portion 165, the elastic arm 170 is returned to an original position. The through portion 165 is in the first state, and the front cover 160 is coupled to the housing 101.

When the toner cartridge 100 is to be removed, a user may input an operation to request replacement of the toner cartridge 100 through the operation panel. The controller, not shown, releases the second locking portion 153 from the first locking portion 553 by slightly rotating the driving coupler 550 in the second rotational direction R2, which is opposite to the first rotational direction R1. In the above state, the toner cartridge 100 is pulled in the removal direction A2. The through portion 165 and the protrusion 104 are not completely separated from each other, but merely have a weakened coupling force therebetween, such that the through portion 165 and the protrusion 104 are not separated from each other even when the toner cartridge 100 is pulled in the removal direction A2. Therefore, the front cover 160 is maintained in a state of being coupled to the housing 101, and the toner cartridge 100 is withdrawn in the removal direction A2. When the interference member 503 is spaced apart from the external force receiving portion 173, the elastic arm 170 is returned to an original position, and the through portion 165 is returned in the first state. Therefore, even when the toner cartridge 100 may be continuously pulled in the removal direction A2, the front cover 160 may not be separated, and the toner cartridge 100 may be removed from the main body 500.

In a case of the toner cartridge 100 provided with the pop-up structure, the pop-up structure may push the toner cartridge 100 in the removal direction A2 to a position where the second coupling portion is returned in the first state. For example, the pop-up structure may push the toner cartridge 100 in the removal direction A2 to a position where the interference between the external force receiving portion 173 and the interference member 503 is finished. As a result, the through portion 165 is returned in the first state, and the protrusion 104 is completely inserted into the through portion 165.

The front cover 160 may be provided with a holding portion 168 which may be held by a hand of a user when the toner cartridge 100 may be mounted on the mounting portion 502 or may be removed from the mounting portion 502. In the above example, the holding portion 168 may be formed to be sunken from a side portion 164 of the front cover 160, but the holding portion 168 may be provided at a side portion 163, an upper portion 161, a lower portion 162 or a front portion 167 of the front cover 160.

Figure 7:
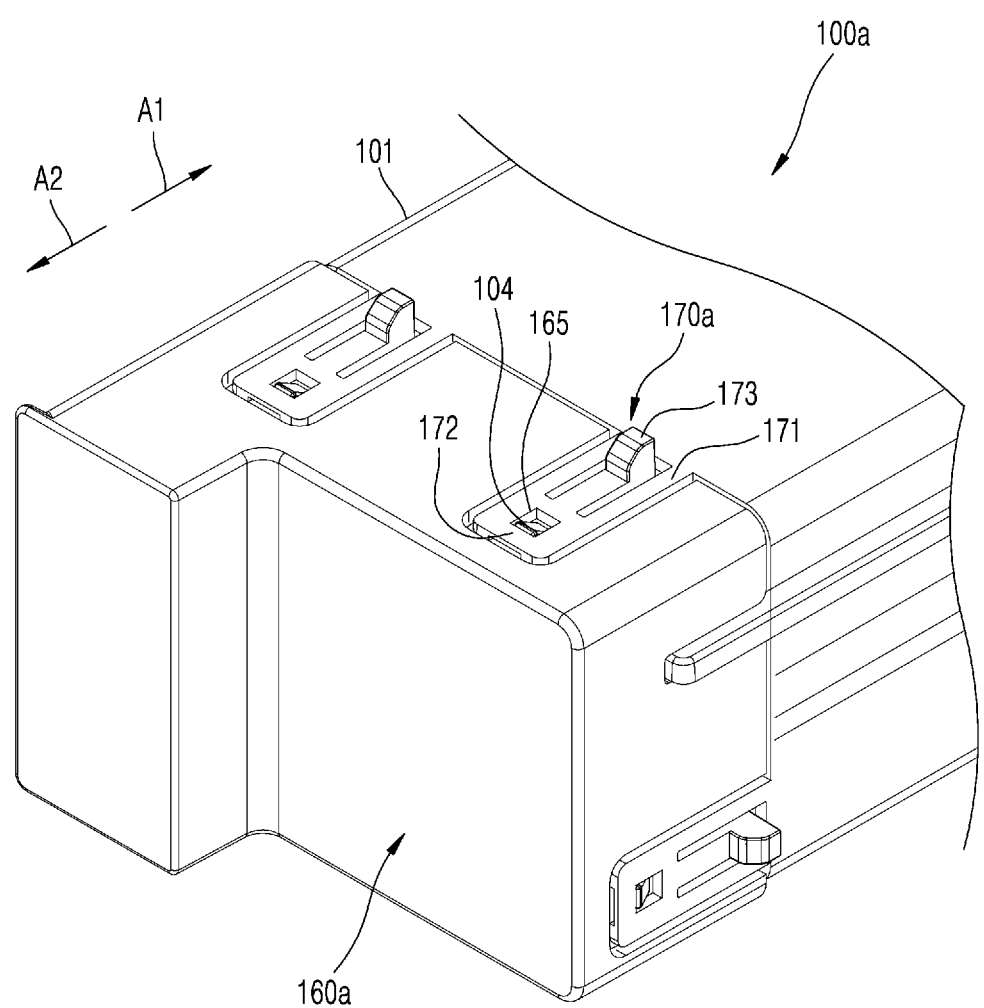
FIG. 7 is a partial perspective view of an example of a toner cartridge.

FIG. 7 is a partial perspective view of an example of a toner cartridge 100*a*. As compared to the toner cartridge 100 shown in FIGS. 4 to 6, the toner cartridge 100*a* of an example has the difference in that the first coupling portion is provided on a front cover 160*a*, and the second coupling portion and the switching member are provided at the housing 101. In other words, the protrusion 104 is provided on the front cover 160*a*. An elastic arm 170*a* is provided at the housing 101, and the through portion 165 is provided at the elastic end portion 172 of the elastic arm 170*a*. The action and effect of the toner cartridge 100*a* are the same as the action and effect of the toner cartridge 100 shown in FIGS. 4 to 6, and thus are omitted.

Figure 8:
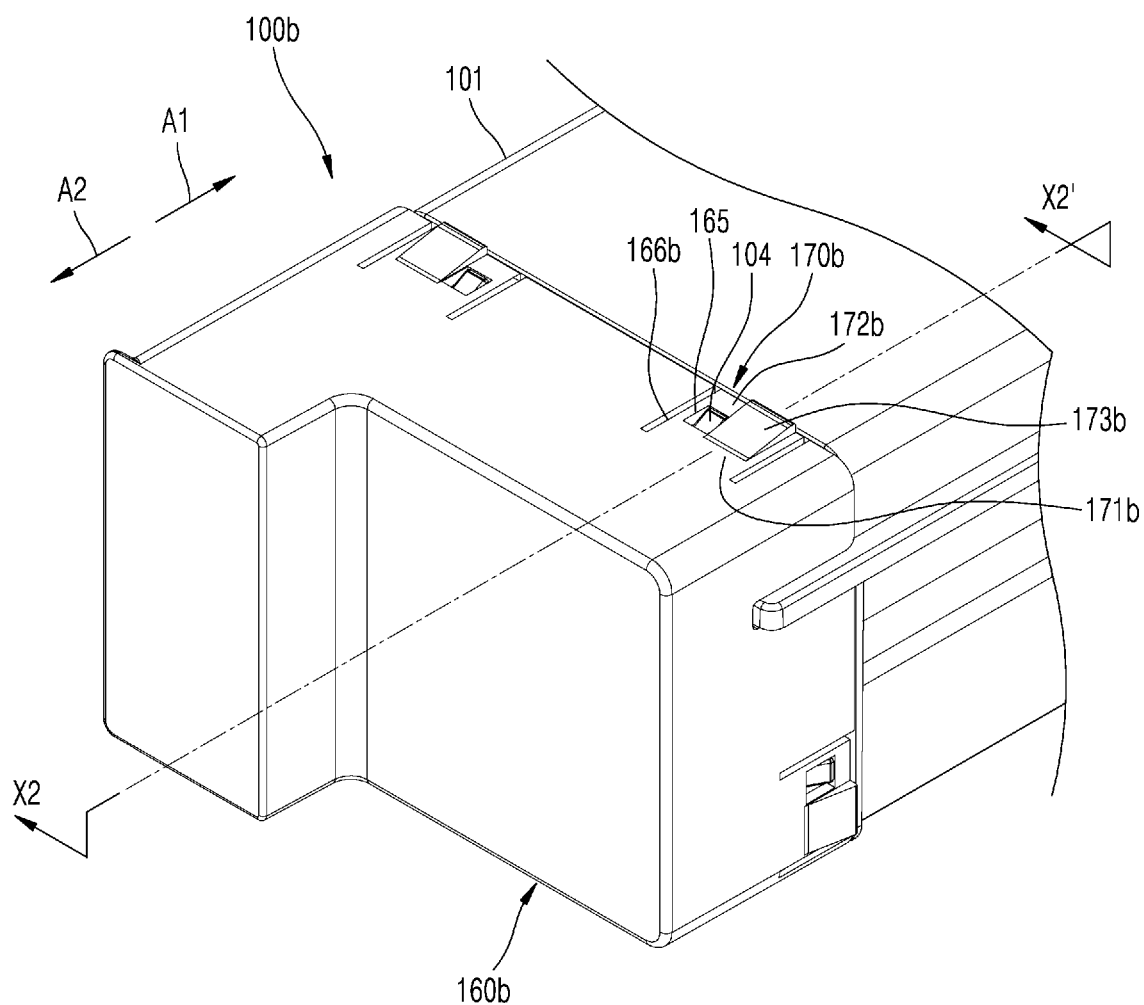
FIG. 8 is a partial perspective view of an example of a toner cartridge.
Figure 9:
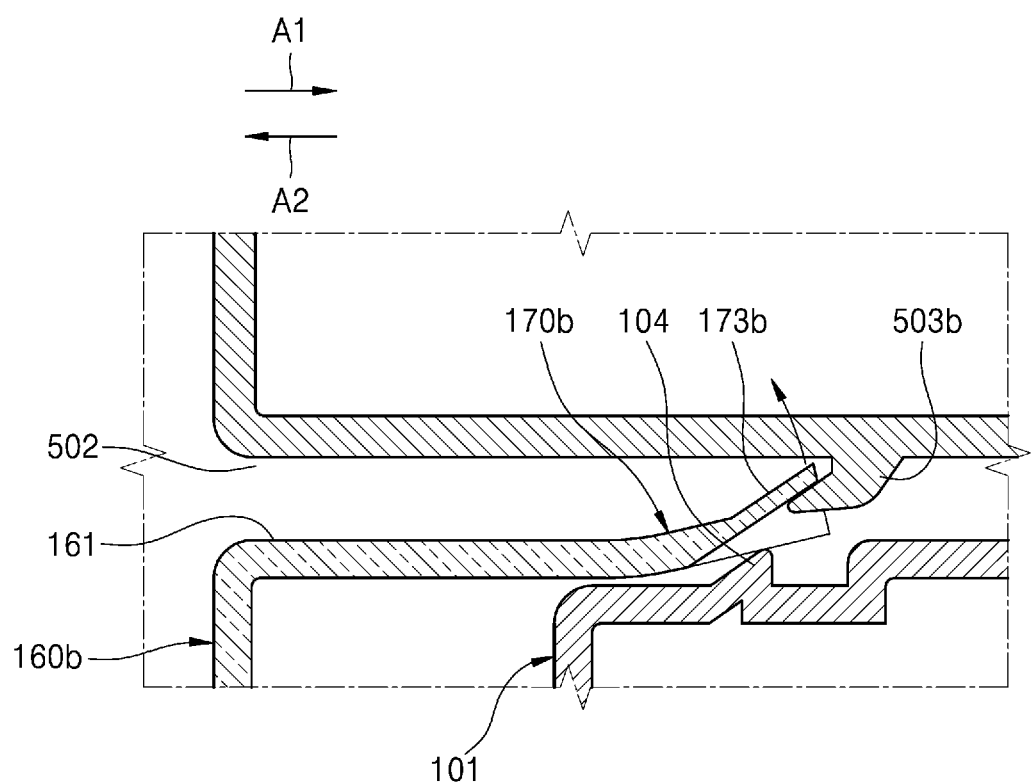
FIG. 9 is a cross-sectional view of the toner cartridge, taken along line X2-X2' of FIG. 8.

FIG. 8 is a partial perspective view of an example of a toner cartridge 100*b*. FIG. 9 is a cross-sectional view of the toner cartridge 100*b*, taken along line X2-X2' of FIG. 8. The toner cartridge 100*b* of an example is different from the toner cartridge 100 shown in FIGS. 4 to 6 in that an external force receiving portion 173*b* is positioned on the same side as an elastic end portion 172*b* with respect to a connection portion 171*b*. The differences will be mainly described below.

Referring to FIGS. 8 and 9, the first coupling portion may be realized by the protrusion 104 provided at one end of the housing 101 in the removal direction A2. The protrusion 104 may protrude in a direction orthogonal to the removal direction A2. The second coupling portion may be realized by the through portion 165 formed through the front cover 160*b* to allow the protrusion 104 to be inserted. The through portion 165 is formed in a direction orthogonal to the mounting direction A1. The switching member is integrally formed with the front cover 160*b*. The front cover 160*b* may be made of plastic, for example. The switching member may include an elastic arm 170*b* which may be elastically bent from the first state to the second state. The elastic arm 170*b* has a connection portion 171*b* connected to the outer circumference portion of the front cover 160*b*, and the elastic end portion 172*b* extending from the connection portion 171*b* and separated from the outer circumference portion by a plurality of slits 166*b*. The elastic end portion 172*b* is provided with the through portion 165. The elastic arm 170*b* may be bent using the connection portion 171*b* as a support portion.

The external force receiving portion 173*b* is provided at the same side as the elastic end portion 172*b* with respect to the connection portion 171*b*. The external force receiving portion 173*b* in an example is applied with the external force in an outward direction. To this end, as shown in FIG. 9, the mounting portion 502 of the main body 500 is provided with an interference member 503*b* inserted into a lower portion of the external force receiving portion 173*b* to lift the external force receiving portion 173*b* outward when the toner cartridge 100 is mounted. When the external force in the outward direction is applied to the external force receiving portion 173*b*, the elastic end portion 172*b* is lifted outward with the external force receiving portion 173*b*, and thus the amount of insertion of the protrusion 104 into the through portion 165 decreases, and the coupling force between the through portion 165 and the protrusion 104 is weakened. In the above state, when the front cover 160*b* may be pulled in the removal direction A2, the front cover 160*b* may be separated from the housing 101 while the through portion 165 is removed from the protrusion 104. Although not shown in the drawing, an example of the toner cartridge 100*b* shown in FIGS. 8 and 9 may be applied as a structure that the first coupling portion is provided on the front cover 160*b* and the second coupling portion and the switching member are provided in the housing 101 as shown in FIG. 7.

Figure 10:
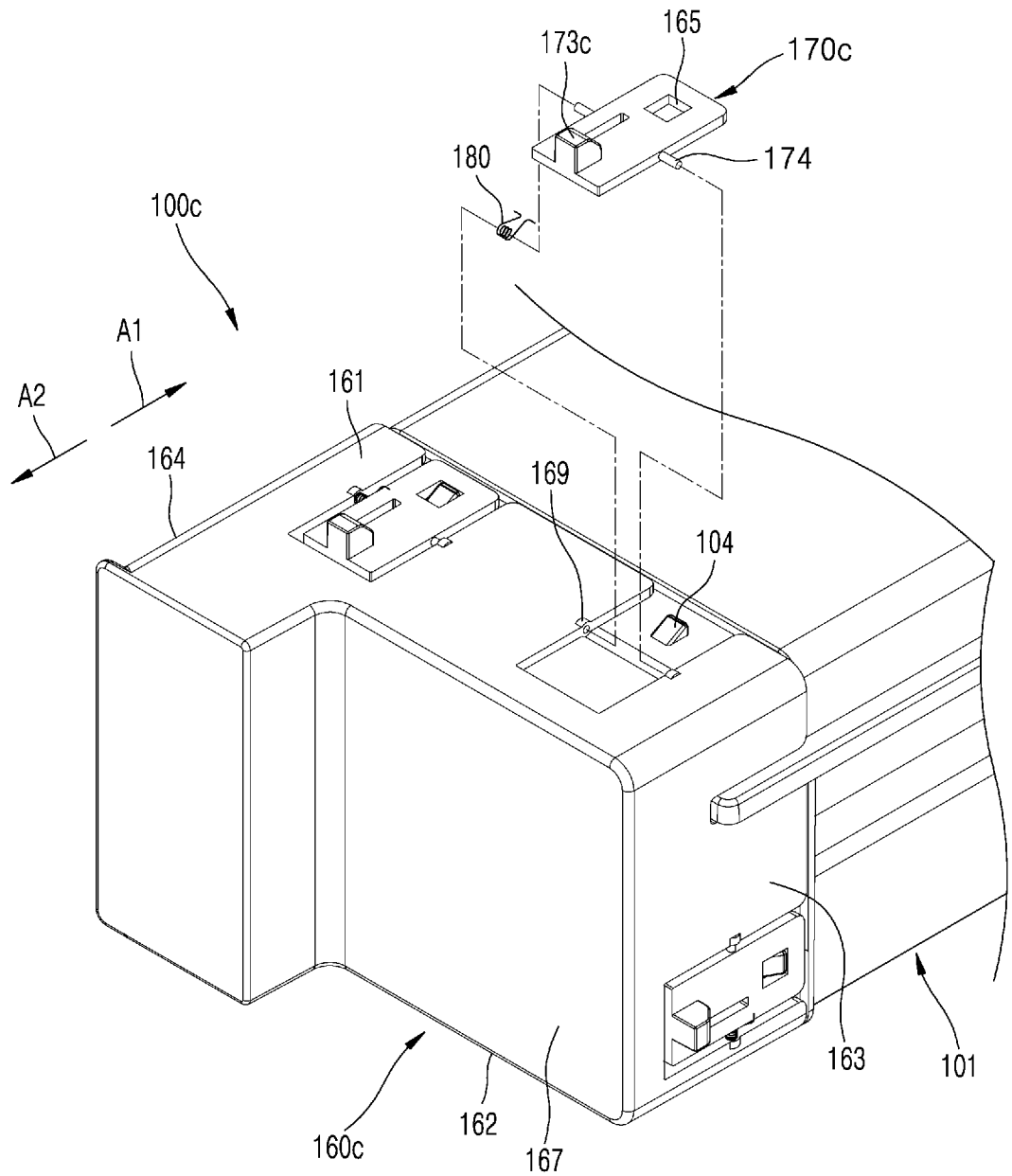
FIG. 10 is a partially exploded perspective view of an example of a toner cartridge.

FIG. 10 is a partially exploded perspective view of an example of a toner cartridge 100c. The toner cartridge 100c of an example is different from the toner cartridge 100 shown in FIGS. 4 to 6 in that the switching member is supported by a front cover 160c to be switched between the first and second states. Differences will be mainly described below.

Referring to FIG. 10, the first coupling portion may be realized by the protrusion 104 provided at one end of the housing 101 in the removal direction A2. The protrusion 104 may protrude in a direction orthogonal to the removal direction A2. The switching member is realized by a rotation member 170c rotatably coupled to the front cover 160c in the first and second states. The second coupling portion may be realized by the through portion 165 formed through the rotation member 170c to allow the protrusion 104 to be inserted. The through portion 165 is formed in a direction orthogonal to the removal direction A2. The rotation member 170c is provided with a rotation shaft 174. The front cover 160c is provided with a shaft support portion 169 into which the rotation shaft 174 is inserted. An elastic member 180 applies the elastic force to the rotation member 170c in a direction of being returned to the first state. According to an example, the elastic member 180 may be realized by a torsion coil spring in which a winding portion is inserted into the rotation shaft 174 and the two arms extending from the winding portion are supported by the front cover 160c and the rotation member 170c, respectively. An external force receiving portion 173c is provided on an opposite side of the through portion 165 with respect to the rotation shaft 174.

When the toner cartridge 100c is separated from the main body 500 or does not reach the mounting position, the rotation member 170c is maintained in the first state by the elastic force of the elastic member 180. Therefore, the protrusion 104 is maintained in a state of being completely inserted into the through portion 165, the front cover 160 is not separated from the housing 101 even when the front cover 160 is held and pulled in the removal direction A2.

When the toner cartridge 100c is mounted on the mounting portion 502 of the main body 500 and approaches the mounting position, the interference member (see 503 of FIG. 2) interferes with the external force receiving portion 173c, and inwardly presses the external force receiving portion 173c. When the toner cartridge 100c reaches the mounting position, the external force receiving portion 173c is completely pressed and the through portion 165 is in the second state. The amount of insertion of the protrusion 104 into the through portion 165 decreases, and thus, the coupling force between the through portion 165 and the protrusion 104 is weakened. In the above state, when the front cover 160c may be pulled in the removal direction A2, the front cover 160c may be separated from the housing 101 while the through portion 165 may be released from the protrusion 104. Although not shown in the drawings, an example of the toner cartridge 100c shown in FIG. 10 may be applied as a structure that the first coupling portion is provided on the front cover 160c and the second coupling portion and the switching member are provided in the housing 101 as shown in FIG. 7.

Figure 11:
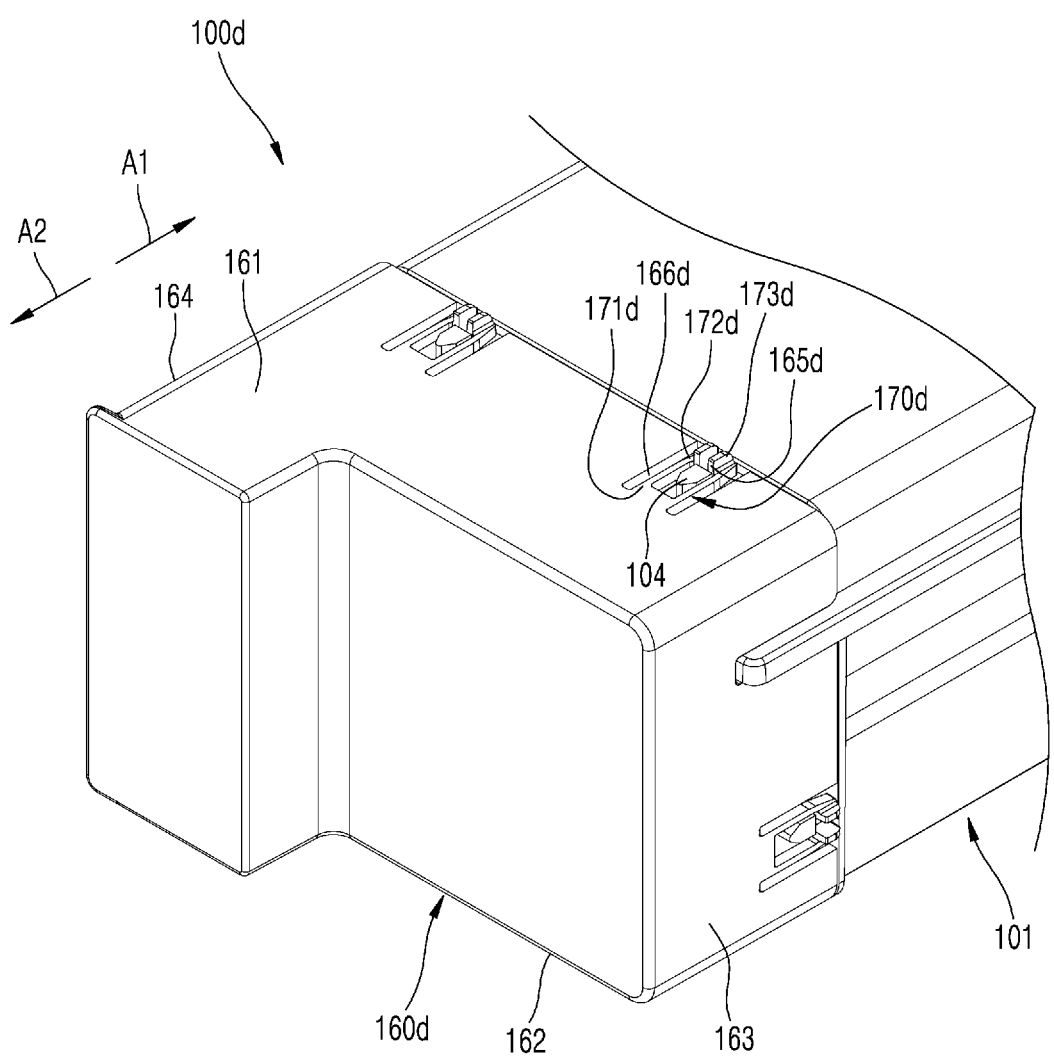
FIG. 11 is a partial perspective view of an example of a toner cartridge.
Figure 12:
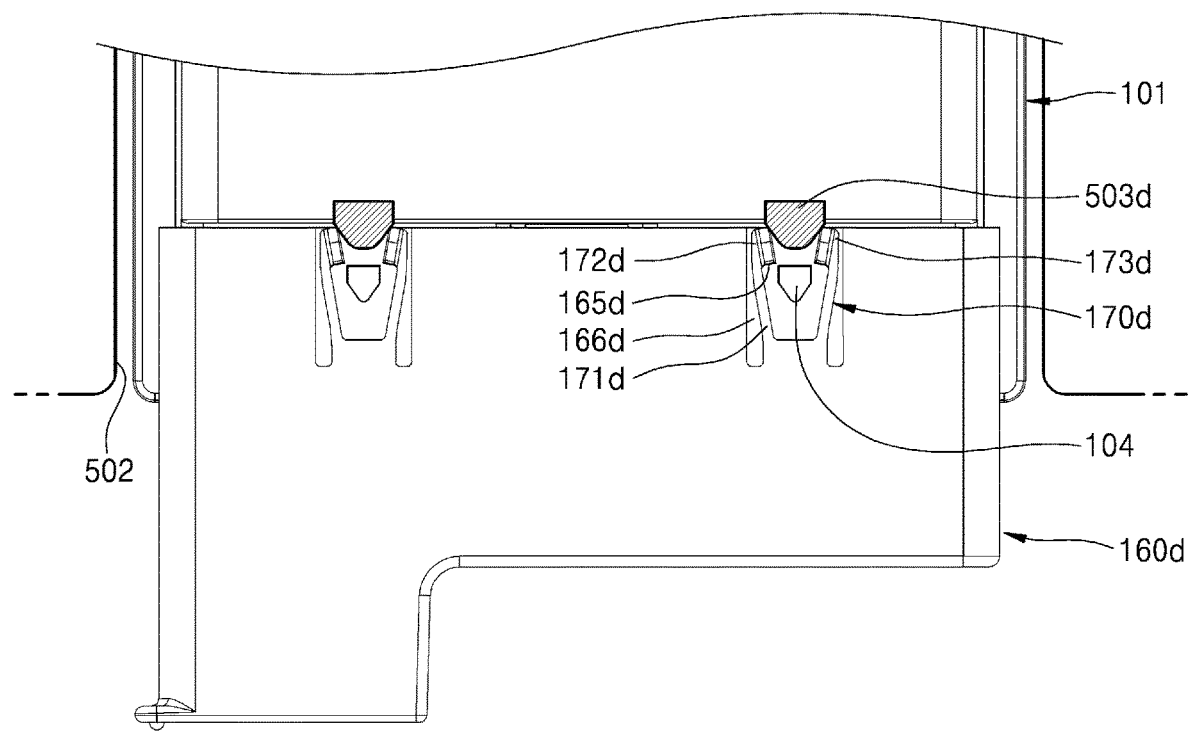
FIG. 12 is a schematic plan view showing a state in which the toner cartridge shown in FIG. 11 is mounted on the mounting portion of the main body.

FIG. 11 is a partial perspective view of an example of a toner cartridge 100d. FIG. 12 is a schematic plan view showing a state in which the toner cartridge 100d is mounted on the mounting portion 502 of the main body 500. The toner cartridge 100d of the example is different from the toner cartridge 100 shown in FIGS. 4 to 6 in that a pair of elastic hooks are employed as a switching member. Differences will be mainly described below.

Referring to FIGS. 11 and 12, the first coupling portion may be realized by the protrusion 104 provided at one end of the housing 101 in the removal direction A2. The protrusion 104 may protrude in a direction orthogonal to the removal direction A2. The second coupling portion is realized by a hook 165d provided on a front cover 160d to allow the protrusion 104 to be locked. The switching member may include an elastic arm 170d which may be elastically bent from the first state to the second state. The elastic arm 170d includes a connection portion 171d connected to an outer circumference portion of the front cover 160d, and an elastic end portion 172d extending from the connection portion 171d and separated from the outer circumference portion of the front cover 160d by a plurality of slits 166d. The elastic arm 170d may be bent using the connection portion 171d as a support portion. The hook 165d is provided at the elastic end portion 172d. The elastic arm 170d may be provided with an external force receiving portion 173d that interferes with the interference member 503 to switch the hook 165d to the second state. The external force receiving portion 173d may extend outward from the hook 165d. The switching member of an example includes a pair of elastic arms 170d each including the connection portion 171d and the elastic end portion 172d, a pair of hooks 165d provided at the pair of elastic arms 170d, and a pair of external force receiving portions 173d extending outward from the pair of hooks 165d.

When the toner cartridge 100d is separated from the main body 500 or does not reach the mounting position, the pair of elastic arms 170d is maintained in the first state by the elastic force. Therefore, the protrusion 104 is maintained in a state of being completely locked by the pair of hooks 165d, and the front cover 160d is not separated from the housing 101 even when the front cover 160d is held and pulled in the removal direction A2.

When the toner cartridge 100d is mounted on the mounting portion 502 of the main body 500 and approaches the mounting position, an interference member 503d interferes with the pair of external force receiving portions 173d. The interference member 503d is inserted between the pair of external force receiving portions 173d, and the external force in a direction of separating the pair of hooks 165d from each other is applied to the pair of external force receiving portions 173d. When the toner cartridge 100d reaches the mounting position, as shown in FIG. 12, the pair of hooks 165d are widened, and thus, the pair of hooks 165d are in the second state. The amount of locking between the protrusion 104 and the pair of hooks 165d decreases, and the coupling force between the pair of hooks 165d and the protrusion 104 is weakened. When the toner cartridge 100d reaches the mounting position, as described in FIG. 3, the driving coupler 550 is slightly rotated in the first rotational direction R1 and the second locking portion 153 of the driven coupler 150 is locked by the first locking portion 553 of the driving coupler 550, and thus, the toner cartridge 100d is locked at the mounting position. In the above state, even when the front cover 160d is held and the toner cartridge 100d is pulled in the removal direction A2, the second and first locking portions 153 and 553 are locked, and thus, the toner cartridge 100d is not moved in the removal direction A2. Instead, the front cover 160d may be separated from the housing 101 while the pair of hooks 165d with weakened coupling force are released from the protrusion 104, and the toner cartridge 100d may be maintained at the mounting position. Although not shown in the drawings, an example of the toner cartridge 100d shown in FIGS. 11 and 12 may be applied as a structure that the first coupling portion is provided on the front cover 160d and the second coupling portion and the switching member are provided at the housing 101 as shown FIG. 7.

Figure 13:
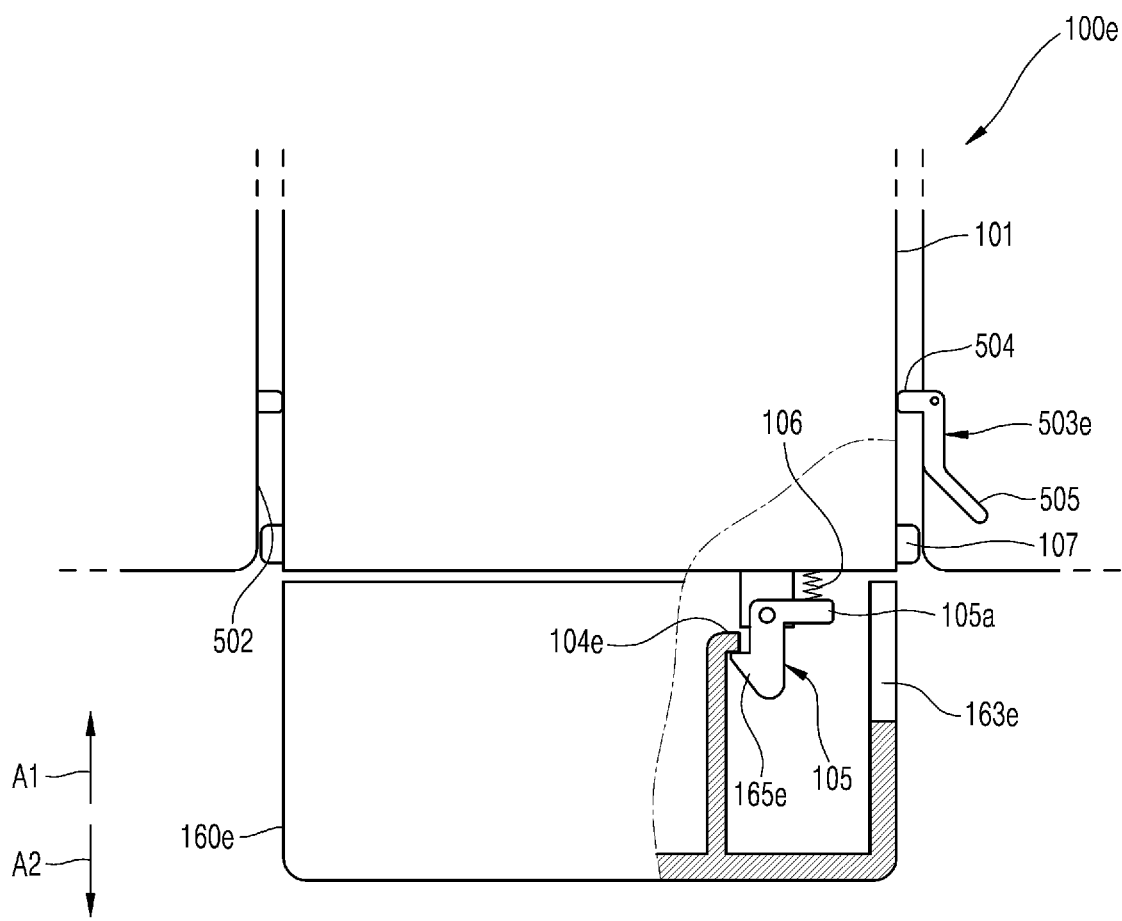
FIG. 13 is a schematic plan view of an example of a toner cartridge.
Figure 14:
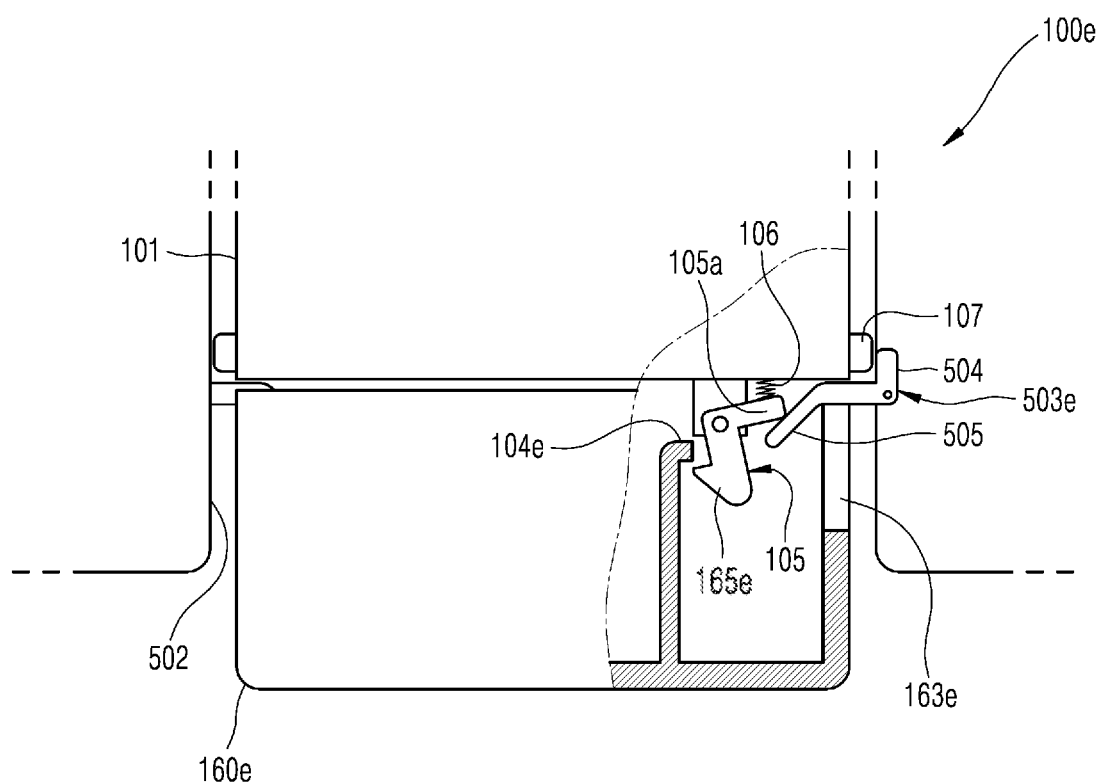
FIG. 14 is a schematic plan view showing a state in which the toner cartridge shown in FIG. 13 is mounted on the mounting portion.

FIG. 13 is a schematic plan view of an example of a toner cartridge 100e. FIG. 14 is a schematic plan view showing a state in which the toner cartridge 100e is mounted on the mounting portion 502. The toner cartridge 100e of the example is different from the toner cartridge 100 shown in FIGS. 4 to 6 in that the first and second coupling portions are positioned inside a front cover 160e. The differences will be mainly described below.

Referring to FIGS. 13 and 14, the first coupling portion is provided at any one of the housing 101 and the front cover 160e, and the switching member includes the second coupling portion coupled to the first coupling portion and an external force receiving portion 105a, and is supported by the other one of the housing 101 and the front cover 160e to be switched between the first and second states. The toner cartridge 100e may include: an elastic member 106 applying an elastic force state to the switching member in a direction of being returned to the first state, and an interference portion 107 to switch an interference member 503e from a retraction position to a protrusion position that interferes with the external force receiving portion 105a when the toner cartridge 100e is mounted on the mounting portion 502.

According to an example, the first and second coupling portions are provided at the front cover 106e and the housing 101, respectively. The first and second coupling portions are positioned inside the front cover 160e. For example, the first coupling portion may be realized by a locking protrusion 104e provided inside the front cover 160e. The second coupling portion may be realized by a hook 165e provided to allow the locking protrusion 104e to be locked by the end of the housing 101.

The switching member can be realized by a rotation arm 105 which is rotatably supported by the housing 101. The hook 165e is provided at an end of the rotation arm 105. The rotation arm 105 may be rotated in a first state (FIG. 13) in which the locking protrusion 104e is locked by the hook 165e and in a second state (FIG. 14) in which the coupling force between the locking protrusion 104e and the hook 165e is weakened. The elastic member 106 applies the elastic force to the rotation arm 105 in a direction of being returned to the first state. Therefore, the rotation arm 105 may be elastically rotated from the first state to the second state. The elastic member 106 may be realized, for example, by a compression coil spring. The rotation arm 105 is provided with the external force receiving portion 105a to receive the external force. The external force receiving portion 105a may extend outward from the rotation arm 105.

The interference member 503e is provided at the mounting portion 502 of the main body 500. The interference member 503e may be switched from the retraction position shown in FIG. 13 to the protrusion position that interferes with the external force receiving portion 105a shown in FIG. 14 in conjunction with an operation in which the toner cartridge 100e is mounted on the mounting portion 502. According to an example, the toner cartridge 100e may include the interference portion 107. The interference portion 107 may protrude, for example, from the toner cartridge 100e toward an inner wall of the mounting portion 502. The interference member 503e may be supported by the mounting portion 502 to be rotated to the retraction position and the protrusion position. The interference member 503e may include an interference arm 504 and an external force applying arm 505. The interference arm 504 is positioned inside the mounting portion 502 to interfere with interference portion 107 of the toner cartridge 100e mounted on the mounting portion 502 in the retraction position. The external force applying arm 505 is positioned outside the mounting portion 502 not to interfere with the interference portion 107. In the protrusion position, the external force applying arm 505 protrudes inside the mounting portion 502. The external force applying arm 505 enters the inside of the front cover 160e through an opening 163e provided at the front cover 160e and pushes the external force receiving portion 105a in an opposite direction of the elastic force of the elastic member 106.

In a state in which the toner cartridge 100e is separated from the main body 500 or does not reach the mounting position, the interference member 503e is positioned in the retraction position. The rotation arm 105 is maintained in the first state by the elastic force of the elastic member 106. Therefore, as shown in FIG. 13, the locking protrusion 104e is maintained in a state of being completely locked by the hook 165e, and even when the front cover 160e is held and pulled in the removal direction A2, the front cover 160e is not separated from the housing 101.

When the toner cartridge 100e is mounted on the mounting portion 502, the interference portion 107 pushes the interference arm 504 to rotate the interference member 503e to the protrusion position as shown in FIG. 14. The external force applying arm 505 enters the inside of the front cover 160e through the opening 163e provided at the front cover 160e and pushes the external force receiving portion 105a in an opposite direction of the elastic force of the elastic member 106. When the toner cartridge 100e reaches the mounting position as shown in FIG. 14, the rotation arm 105 is in the second state. The amount of locking between the locking protrusion 104e and the hook 165e decreases, and the coupling force between the hook 165e and the locking protrusion 104e is weakened. As described in FIG. 3, the driving coupler 550 is slightly rotated in the first rotational direction R1, and the second locking portion 153 of the driven coupler 150 is locked by the first locking portion 553 of the driving coupler 550, and thus, the toner cartridge 100d is locked at the mounting position. In the above state, even when the front cover 160e is held and the toner cartridge 100e is pulled in the removal direction A2, the toner cartridge 100e is locked by the second and first locking portions 153 and 553, and thus, is not moved in the removal direction. Instead, the front cover 160e may be separated from the housing 101 while the locking protrusion 104e with the weakened coupling force may be released from the hook 165e, and the toner cartridge 100e may be maintained at the mounting position. Although not shown in the drawings, an example of the toner cartridge 100e shown in FIGS. 13 and 14 may be applied as a structure that the first coupling portion is provided at the housing 101 and the second coupling portion and the switching member are provided on the front cover 160e, as shown FIG. 7.

It should be understood that examples described herein should be considered in a descriptive sense and should not be limiting. Descriptions of features within each example should be considered as available for other similar features in other examples. While one or more examples have been described with reference to the drawings, it will be understood that various changes in form and details may be made therein without departing from the spirit and scope as defined by the following claims.

What is claimed is:

1. An image forming apparatus, comprising:
a main body provided with a mounting portion and an interference member; and
a toner cartridge mountable on the mounting portion, the toner cartridge including:
a housing to contain toner,
a coupling portion,
a front cover coupled to one end of the housing via the coupling portion, and
a switching member to weaken a coupling force of the coupling portion by interfering with the interference member when the toner cartridge is mounted on the mounting portion,
wherein
the coupling portion includes a first coupling portion disposed at one of the housing and the front cover, and a second coupling portion provided at the other one of the housing and the front cover and coupled to the first coupling portion, and
the switching member includes the second coupling portion, and is provided at the other one of the housing and the front cover to elastically switch from a first state in which the first and second coupling portions are coupled to each other to a second state in which the coupling force of the first and second coupling portions is weakened so that the front cover is separable from the housing, by interfering with the interference member when the toner cartridge is mounted on the mounting portion.

2. The image forming apparatus of claim 1, wherein the switching member includes an elastic arm disposed at the other one of the housing and the front cover to be elastically bent when the switching member switches from the first state to the second state.

3. The image forming apparatus of claim 2, wherein
the first coupling portion includes a protrusion,
the second coupling portion includes a through portion penetrating an end of the elastic arm to allow the protrusion to be inserted into the through portion, and
the elastic arm includes an external force receiving portion to interfere with the interference member to move the through portion when the switching member switches from the first state to the second state.

4. The image forming apparatus of claim 2, wherein
the first coupling portion includes a protrusion,
the second coupling portion includes a hook disposed at the elastic arm to allow the protrusion to be locked, and
the hook includes an external force receiving portion to interfere with the interference member.

5. The image forming apparatus of claim 1, wherein
the switching member is supported by the other one of the housing and the front cover to be switched between the first and second states,
the switching member includes an elastic member to apply an elastic force to the switching member in a direction such that the switching member is returned to the first state, and
the switching member includes an external force receiving portion to interfere with the interference member.

6. The image forming apparatus of claim 1, wherein
the switching member includes an external force receiving portion to interfere with the interference member, and is supported by the other one of the housing and the front cover to be switched between the first and second states,
the switching member includes an elastic member to apply an elastic force to the switching member in a direction such that the switching member is returned to the first state, and
the toner cartridge includes an interference portion to switch the interference member from a retraction position to a protrusion position to interfere with the external force receiving portion, when the toner cartridge is mounted on the mounting portion.

7. The image forming apparatus of claim 1, wherein the front cover includes a concave holding portion.

8. A toner cartridge, comprising:
a housing to contain toner;
a front cover coupled to one end of the housing;
a first coupling portion disposed at one of the housing and the front cover;
a second coupling portion disposed at the other one of the housing and the front cover and having a shape complementary to a shape of the first coupling portion; and
a switching member including the second coupling portion, and disposed at the other one of the housing and the front cover to elastically switch from a first state in which the first and second coupling portions are coupled to each other to a second state in which a coupling force of the first and second coupling portions is weakened so that the front cover is separable from the housing, when an external force is received by the switching member.

9. The toner cartridge of claim 8, wherein the switching member is formed integrally with the other one of the housing and the front cover.

10. The toner cartridge of claim 9, wherein the switching member includes an elastic arm disposed at the other one of the housing and the front cover to be elastically bent when the switching member switches from the first state to the second state.

11. The toner cartridge of claim 10, wherein
the first coupling portion includes a protrusion,
the second coupling portion includes a through portion penetrating an end of the elastic arm to allow the protrusion to be inserted into the through portion, and
the elastic arm includes an external force receiving portion to interfere with the interference member to move the through portion when the switching member switches from the first state to the second state.

12. The toner cartridge of claim 10, wherein
the first coupling portion includes a protrusion,
the second coupling portion includes a hook disposed at the elastic arm to allow the protrusion to be locked, and
the hook includes an external force receiving portion to interfere with the interference member.

13. The toner cartridge of claim 8, wherein
the switching member is supported by the other one of the housing and the front cover to be switched between the first and second states,
the switching member includes an elastic member to apply an elastic force to the switching member in a direction such that the switching member is returned to the first state, and
the switching member includes an external force receiving portion to interfere with the interference member.

14. The toner cartridge of claim 8, wherein the front cover includes a concave holding portion.

* * * * *